Figure 1:
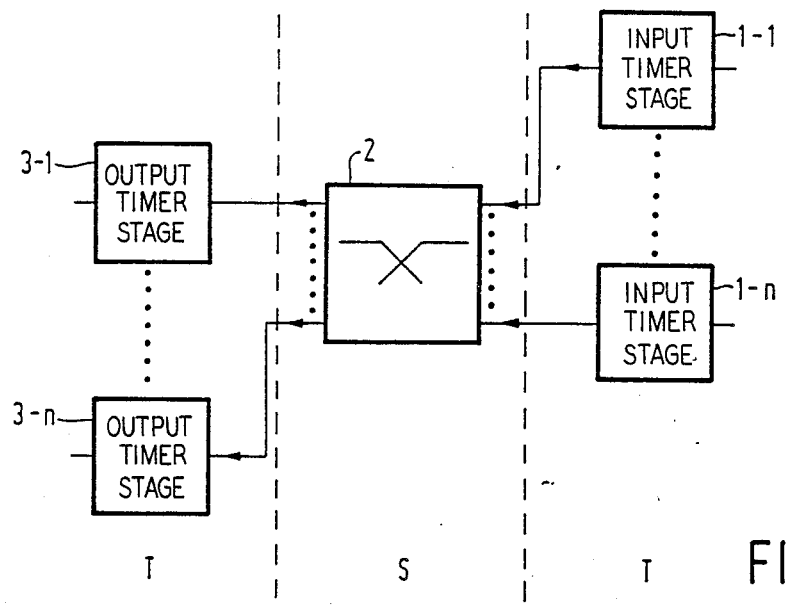

United States Patent [19]

Sennema

[11] Patent Number: 4,962,499
[45] Date of Patent: Oct. 9, 1990

[54] SWITCHING SYSTEM FOR SWITCHING PACKET ORIENTED DATA AS WELL AS CIRCUIT ORIENTED DATA

[75] Inventor: Ronald T. Sennema, Hilversum, Netherlands

[73] Assignee: AT&T Bell Laboratories, Murray Hill, N.J.

[21] Appl. No.: 360,496

[22] Filed: Jun. 2, 1989

[30] Foreign Application Priority Data

Jun. 9, 1988 [NL] Netherlands .......................... 8801481

[51] Int. Cl.$^5$ ............................................. H04J 3/24
[52] U.S. Cl. ..................................... 370/94.1; 370/60.1
[58] Field of Search ......................... 370/60, 60.1, 94.1

[56] References Cited

U.S. PATENT DOCUMENTS 4,603,416  7/1986  Servel et al. ........................... 370/60

Primary Examiner—Douglas W. Olms
Assistant Examiner—Christopher O. Edwards
Attorney, Agent, or Firm—Peter Visserman

[57] ABSTRACT

Two separate switching systems, a first one for switching packet oriented data and a second one for switching circuit oriented data as known from the state of the art can, according to the invention and with regard to their function, be integrated into a single switching system. This is realized by storing the packet oriented data in a first section of a switch memory (33) and the circuit oriented data in a second section of this same switch memory (33).

With this realization additional advantages occur such as a movable boundary in the switch memory (33) between the packet oriented section and the circuit oriented section and a saturation monitoring that can be realized in a simple fashion in the switch memory (33).

2 Claims, 1 Drawing Sheet

SWITCHING SYSTEM FOR SWITCHING PACKET ORIENTED DATA AS WELL AS CIRCUIT ORIENTED DATA

The invention relates to a switching system for switching packet oriented data as well as circuit oriented data.

Such a switching system is known from the International Patent Application No. Wo 84/01246.

The switching system for telecommunications purposes which is described in the above mentioned Patent Application No. WO84/01246 is to be able to switch packet oriented data (for example, data that are transferred between computers) as well as circuit oriented data (for example, speech signals in telephone connections). Thereto, this switching system comprises a packet switch as well as a circuit switch. The packet switch is used for switching the packet oriented data, whilst the circuit switch is used for switching the circuit oriented data. The packet switch comprises a first circuit (packet access circuit) which is intended to allow to pass the packet oriented data and block the circuit oriented data. The circuit switch comprises a timer stage (TS) and a second circuit (port data store) which is intended to allow to pass the circuit oriented data and block the packet oriented data. Both switches are connected to a data bus which transfers the packet oriented data as well as the circuit oriented data. So the packet oriented data and the circuit oriented data are switched via two fully separated switches.

It is an object of the present invention to provide a improved switching system in which the packet switching function and the circuit switching function are integrated.

Thereto, the present invention is characterized in that this switching system comprises at least one input timer stage capable of switching circuit oriented data, this input timer stage comprising:

A data store which is operated in the controlled output mode, which data store comprises:
  a data input which is connected to an incoming packet bus via transfer means for undelayed transfer of a packet upon receipt,
  a data output; and
  an address input;

An addressing arrangement for producing write addresses that are destined for the data store and a central controller, which addressing arrangement comprises:
  a data output which is connected to the address input of the data store and allows to be connected to the central controller; and
  a control input which is arranged for receiving a packet signal for producing a write address in response to the detection of a packet;

A VCI buffer for applying to the central controller a virtual circuit identifier associated to a packet, to be called VCI, hereinafter, which VCI buffer has:
  an input which is connected to the incoming packet bus; and
  an output which allows to be connected to the central controller; and A routing memory for producing per packet to be read the relevant data store address, which routing memory comprises:
  a data output which is connected to the address input of the data store;
  a data input which allows to be connected to the central controller, and
  an address input which is optionally connectable to a counter or to the central controller, the address input of the data store being optionally connectable to the data output of the addressing arrangement or the data output of the routing memory.

One section of the data memory is intended for circuit oriented data. Another section is intended for packet oriented data. A packet is written into the latter section of the data store at a location having a data store address provided by the addressing arrangement. Both this data store address associated to the packet and the virtual circuit packet identifier (to be called VCI hereinafter), this VCI being stored in the VCI buffer, are transferred to the central controller. The reading of a data packet from the data store is effected under the control of the routing memory, whilst the order number of the read time slot is equal to the data store address. This equality is realized by selecting the desired time slot number for the routing memory address and providing the relevant memory location with the data store address of the packet to be read in that time slot. The time slot number is added to the data store address by the central controller with the aid of a routing algorithm known per se and not forming a part of the invention.

A switching system as described hereinbefore has the additional advantage that in the data store the boundary between packet oriented data and circuit oriented data can be made movable. Consequently, in the event of an above-average supply of packet oriented data a larger section of the data store can be reserved for them. Conversely, in the event of an above-average supply of circuit oriented data a larger section of the data store can be reserved for circuit oriented data.

A preferred embodiment of the switching system according to the invention is characterized in that the addressing arrangement comprises a memory of the First In First Out type (FIFO) which includes:
  a data output forming the data output of the addressing arrangement;
  a control input forming the control input of the addressing arrangement and;
  a data input connected to the data output of the routing memory.

When the switching system begins to operate, the FIFO memory is being loaded with data store addresses of idle data store locations, thus with all the addresses of the packet section of the data store. The addressing arrangement formed by the FIFO memory provides a data store address of an idle memory location per packet to be written. If there are no data store addresses of idle memory locations for the incoming packets available, the FIFO memory is empty. The addressing arrangement then no longer produces any data store addresses. Thus, by using the FIFO memory a saturation monitoring of the data store has become possible. This achieves that if the data store threatens to be saturated, the FIFO memory provides an alarm signal. In response to this signal appropriate measures can be taken such as restriction of the traffic supply or losing the packets.

Figure 2:
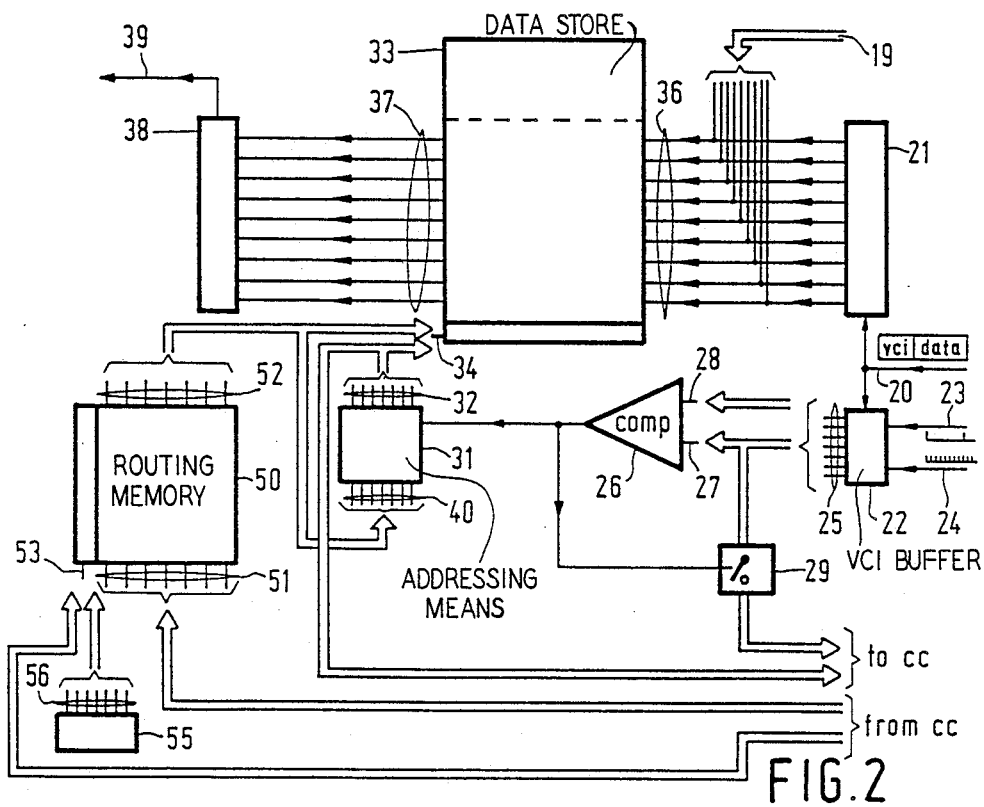

The invention will be further explained with reference to the embodiment shown in the Figures, in which:

FIG. 1 shows a known switching system of the TST type (Time Space Time),

FIG. 2 shows an input timer stage according to the invention. The switching system shown in FIG. 1 comprises n input timer stages 1 - 1 to 1 - n (generally 1 - i), a space switching stage 2 and n output timer stages 3 - 1 to 3 - n (generally 3 - j). The output of each input stage 1 - i is connected to an input of the space switching stage 2. The input of each output timer stage 3 - j is connected to an output of the space switching stage 2.

Information entering an input timer stage 1 - i has already been spread out over time slots and is rearranged over the time slots by the input timer stage 1 - i and then transferred to the space switching stage 2. The space switching stage 2 connects the input receiving this information to one of its outputs. Subsequently, the information is transferred to the relevant output timer stage 3 - j and switched to the proper tire slot by this output timer stage 3 - j.

The input timer stage represented in FIG. 2 includes a parallel incoming bus 19 for circuit traffic, which bus is connected to the data input 36 of data store 33. The input timer stage further includes a serial incoming packet-bus 20 which is connected to transfer means, which are formed in this embodiment by a serial-to-parallel converter 21, whose parallel output is connected to the data input of data store 33 as well as the incoming circuit-bus 19. The incoming packet bus 20 is also connected to the input of the VCI buffer 22, which is further connected to packet pulse conductor 23 and bit clock conductor 24.

Output 25 of VCI buffer 22 is connected to an input 27 of comparator 26 and via inhibiting switch 29 to the central controller. Another input 28 of comparator 26 is provided with a codeword representing one Empty Packet Code (EPC). The output of comparator 26 is connected to the control input of inhibiting switch 29 and a control input of the addressing arrangement 31.

Addressing means 31 is arranged as a memory of the First In First Out type (FIFO) in this embodiment. Data output 32 of FIFO 31 is connected to address input 34 of data store 33 and the central controller. Data input 40 of FIFO 31 is connected to data output 52 of routing memory 50. This data output 52 is connected, as is data output 32, to address input 34 of data store 33. The data output 37 of data store 33 is connected to the input of parallel-to-serial converter 38, whose output 39 forms the outgoing bus. This bus is represented in FIG. 1 by the conductor interconnecting the input timer stage 1 - i and the space switching stage 2.

From the routing memory 50 the data input 51 is connected to the central controller and address input 53 is connected to both the central controller and output 56 of cycle counter 55.

Data store 33 can be conceived to be divided into two sections. One section is intended to store circuit oriented data, whilst the other section is intended to store packet oriented data.

Data store 33 is driven in the controlled output mode. This is to say that incoming packets are written at sequential idle locations. On the other hand, they are read according to the addresses specified by the central controller, the order of the addresses being determined by the order of the outgoing time slots in which the relevant packets are to be positioned. A packet entering via packet bus 20 is transferred to serial-to-parallel converter 21, at whose output the packet appears in the parallel mode. This serial-to-parallel conversion of the packet can be effected in a single operation so as to have the whole packet appear in the parallel mode at the parallel output. For long packets (for example 512 bits in length) it is possible to first divide the incoming packet into segmented packets which are then subjected to the serial-to-parallel conversion, upon which these segmented packets are written into memory locations of data store 33 belonging together. At the same time the Virtual Circuit Identifier of the packet, henceforth to be called VCI, is applied to the VCI buffer 22, where the VCI appears in the parallel mode at output 25. From output 25 the VCI is applied to input 27 of comparator 26. At this point the VCI is compared to the Empty Packet Code (EPC) available at the other input 28.

If the VCI and the EPC match, this indicates that an empty packet is concerned. The comparator 26 will then apply an output signal to inhibiting switch 29 in response whereto inhibiting switch 29 will inhibit: the VCI will not be applied to the central controller.

In the case when the arriving packet is filled with information, the associated VCI is applied indeed to the central controller. In addition, in this case FIFO 31 supplies a write address of an idle memory location to address input 34 of data store 33 under the control of the output signal from comparator 26. At this location the packet is then written into the data store. Together with the VCI the address of this location is applied to the central controller.

Thus, the central controller receives the VCI of every incoming full packet and also the address at which the packet is stored in the data store 33. To enable reading out of a packet stored in this fashion in a selected time slot, the central controller produces a read address of data store 33 by means of a routing algorithm known per se and not included in the invention. The code word representing this address is applied to data input 51 of routing memory 50, once a free rout for that packet is available. At the same time, the central controller applies an address associated to this codeword to address input 53 of routing memory 50, this address indicating the location in this routing memory 50 at which the relevant read address is stored.

During read cycles of routing memory 50, cycle counter 55 provides an address at its output 56 which address is applied to address input 53 of routing memory 50. The data available at this location in the routing memory 50 (i.e. the address of the packet to be read (in data store 33)) then appear at data output 52 of routing memory 50. This read address is applied to address input 34 of data store 33 and the packet available at this location is read via data output 37 this packet is applied to parallel-to-serial converter 38. The packet then leaves the input timer stage via bus 39.

Data output 32 of FIFO 31 and data output 52 of routing memory 50 are both connected to address input 34 of data store 33. This is effected, for example, with the aid of switching means known per se and not shown in the Figure, which selectably connect address input 34 to data output 32 or data output 52. It is equally possible to provide data store 33 with a write address input as well as a read address input. In this case data output 32 is to be connected to the write address input and data output 52 to the read address input.

A similar realization is feasible with address input 53 of routing memory 50.

What is claimed is:

1. A switching system for switching packet oriented data and circuit oriented data, characterized in that this switching system comprises at least one input timer stage capable of switching circuit oriented data, this input timer stage comprising:

a data store which is operated in a controlled output mode, which data store comprises:
- a data input which is connected to an incoming packet bus via transfer means for undelayed transfer of a packet upon receipt,
- a data output; and
- an address input;

an addressing arrangement for producing write addresses that are destined for the data store and a central controller, which addressing arrangement comprises:
- a data output which is connected to the address input of the data store and to the central controller; and
- a control input which is arranged for receiving a packet signal for producing a write address in response to the detection of a packet;

a VCI buffer for applying to the central controller a virtual circuit identifier associated to a packet, to be called VCI hereinafter, which VCI buffer has:
- an input which is connected to the incoming packet bus; and
- an output which allows to be connected to the central controller; and a routing memory for producing per packet to be read the relevant data store address, which routing memory comprises:
- a data output which is connected to the address input of the data store,
- a data input which allows to be connected to the central controller, and
- an address input which is optionally connectable to a counter or to the central controller, The address input of the data store being optionally connectable to the data output of the addressing arrangement or the data output of the routing memory.

2. A switching system as claimed in claim 1, characterized in that the addressing arrangement comprises a memory of the First In First Out type (FIFO) which includes:
- a data output forming the data output of the addressing arrangement;
- a control input forming the control input of the addressing arrangement; and
- a data input connected to the data output of the routing memory.

* * * * *